(12) United States Patent
Grospeaud et al.

(10) Patent No.: US 12,231,013 B2
(45) Date of Patent: Feb. 18, 2025

(54) ELECTRICAL WINDING FOR A ROTATING ELECTRICAL MACHINE

(71) Applicant: VALEO EQUIPEMENTS ELECTRIQUES MOTEUR, Creteil (FR)

(72) Inventors: Maxime Grospeaud, Creteil (FR); Alexandre Schmitt, Creteil (FR); Clement Bernard, Creteil (FR); Jean-Francois Gautru, Creteil (FR); Wojciech Mandok, Czechowice (PL); Stephane De Clercq, Creteil (FR); Cyril Picard, Creteil (FR)

(73) Assignee: VALEO EQUIPEMENTS ELECTRIQUES MOTEUR, Creteil (FR)

( * ) Notice: Subject to any disclaimer, the term of this patent is extended or adjusted under 35 U.S.C. 154(b) by 257 days.

(21) Appl. No.: 17/621,588

(22) PCT Filed: Jun. 23, 2020

(86) PCT No.: PCT/EP2020/067459
§ 371 (c)(1),
(2) Date: Dec. 21, 2021

(87) PCT Pub. No.: WO2020/260259
PCT Pub. Date: Dec. 30, 2020

(65) Prior Publication Data
US 2022/0360130 A1 Nov. 10, 2022

(30) Foreign Application Priority Data
Jun. 27, 2019 (FR) ...................................... 19 07066

(51) Int. Cl.
*H02K 3/50* (2006.01)
*H02K 3/28* (2006.01)

(52) U.S. Cl.
CPC ................. *H02K 3/50* (2013.01); *H02K 3/28* (2013.01)

(58) Field of Classification Search
CPC .................................. H02K 3/50; H02K 3/28
(Continued)

(56) References Cited

U.S. PATENT DOCUMENTS

2002/0011753 A1* 1/2002 Asao ...................... H02K 15/12
310/201
2005/0248229 A1 11/2005 Even et al.
(Continued)

FOREIGN PATENT DOCUMENTS

EP     3 029 810 A2    6/2016
FR     3 020 521 A1   10/2015
(Continued)

OTHER PUBLICATIONS

International Search Report issued Jul. 16, 2020 in PCT/EP2020/067459, filed on Jun. 23, 2020, 2 pages.
(Continued)

*Primary Examiner* — Alexander Talpalatski
(74) *Attorney, Agent, or Firm* — Oblon, McClelland, Maier & Neustadt, L.L.P.

(57) ABSTRACT

A winding for an active portion of a rotary electric machine has at least one phase system including a plurality of phases each including a first energizing pin and a second energizing pin each forming a phase input or output. Each energizing pin includes an energizing end that extends out of the slot and each energizing end that forms a phase output being electrically connected to an energizing end that forms a phase input of a different phase, in order to achieve a delta configuration. The winding includes a first set including at least one energizing end forming a phase input and at least one other energizing end forming a phase output, and a
(Continued)

second set including at least one energizing end forming a phase input and at least one other energizing end forming a phase output.

18 Claims, 6 Drawing Sheets

(58) Field of Classification Search
USPC .......................................................... 310/71
See application file for complete search history.

(56) References Cited

U.S. PATENT DOCUMENTS

| | | |
|---|---|---|
| 2008/0042508 A1 | 2/2008 | Cai |
| 2016/0149453 A1* | 5/2016 | Tanaka ................. H02K 15/045 |
| | | 310/71 |
| 2016/0164359 A1 | 6/2016 | Han et al. |
| 2017/0040859 A1 | 2/2017 | Langlard |
| 2017/0047796 A1 | 2/2017 | Darras et al. |
| 2017/0237310 A1* | 8/2017 | Nakamura ............... H02K 3/02 |
| | | 310/195 |

FOREIGN PATENT DOCUMENTS

| | | |
|---|---|---|
| FR | 3 075 502 A1 | 6/2019 |
| WO | WO 2007/146252 A2 | 12/2007 |
| WO | WO 2015/158988 A2 | 10/2015 |

OTHER PUBLICATIONS

Chinese Office Action issued Apr. 30, 2024, in Chinese Patent Application No. 202080044609.2, filed Jun. 23, 2020 (14 pages).

* cited by examiner

ELECTRICAL WINDING FOR A ROTATING ELECTRICAL MACHINE

The invention in particular relates to an electric winding for an active portion, such as a stator or rotor, of a rotary electric machine. The invention more particularly relates to an electric winding produced using conductive pins.

The invention is particularly advantageously applicable to the field of rotary electric machines such as alternators, starter-alternators, or reversible machines or electric motors. It will be recalled that a reversible machine is a rotary electric machine that is able to operate reversibly, on the one hand, as an electric generator when functioning as an alternator and, on the other hand, as an electric motor for example for starting the combustion engine of the motor vehicle.

A rotary electric machine comprises a rotor that is rotatable about an axis, and a fixed stator. The stator has a body that has a yoke that forms a part that is axisymmetric, i.e. of revolution, about an axis passing through the center of the stator. The body comprises teeth that extend radially from the yoke toward the center of the stator and that define slots around which an electric winding is placed. The winding is formed of a plurality of conductive pins that are partially housed in the slots of the body and that are electrically connected pairwise via their ends to form a continuous electrical path. For example, each pin comprises two conductive segments that are substantially parallel to each other and that are connected by a dog-legged junction so as to form a "U". The conductive segments are inserted via a first axial end face of the stator, into two separate slots, so that the conductive segments are substantially parallel to the axis of revolution of the stator. A given slot may house a plurality of segments belonging to different pins, thus forming various layers of conductive segments. The free ends of the conductive segments, which protrude from a second axial end face of the stator, are then connected to each other so as to form electrical paths that generate magnetic fields along the teeth of the body when they are passed through by an electric current. In other words, the conductive pins are connected pairwise so as to form various sets, each set in particular possibly corresponding to one electrical supply phase. For example, the stator comprises three distinct sets in order to allow the winding to be energized with a three-phase current.

Such a winding requires a certain number of connections, in particular between the energizing pins forming the inputs and outputs of each phase, to connect the phases to one another and thus achieve the desired configuration of the winding. These connections are generally made by means of an interconnector arranged between the ends of the energizing pins. The interconnector is for example composed of electrical interconnection tracks that are placed above or on the side of the winding, that may be overmolded in a plastic and that are electrically connected to the ends of the connecting pins.

When the desired configuration is the delta configuration, an output of one phase is connected to the input of the next phase and so on until all phases of the given phase system are electrically connected at its two ends. Usually, each phase is wound in the slots identically. Thus, the following is obtained: the energizing pins forming the phase inputs are located in a single of the layers of the slot, whatever the phase, and the energizing pins forming the phase outputs are located in a single other of the layers of the slot, whatever the phase, said two layers being different for the inputs and outputs. In other words, all the phase inputs of all the phases of the system are aligned along a circumference of the stator, and all the phase outputs of all the phases of the system are aligned along a circumference of the stator that is different from the circumference comprising the inputs. This arrangement of the phase inputs/outputs means that at least two tracks of the interconnector must cross to achieve the delta configuration. Production of the interconnector is thus complex because it is necessary to allow tracks to cross to achieve the delta configuration without excessively increasing the bulk of the interconnector, which has a direct impact on the dimensions, in particular the axial dimensions, of the stator and more generally of the rotary electric machine.

The present invention aims to allow the drawbacks of the prior art to be avoided. To this end, one subject of the present invention is therefore an electric winding for an active portion, which portion is in particular formed of a stator or of a rotor, of a rotary electric machine, the active portion comprising a body having an annular yoke about an axis and a plurality of teeth that extend from a lateral face of the yoke in a radial direction so as to define slots, said slots opening onto a first axial end face and onto a second axial end face of the body. According to the present invention, the electric winding has at least one phase system comprising a plurality of electrical phases each comprising a set of pins that are electrically connected to one another and that each have at least one conductive segment, said conductive segments intended to be housed in the same slot forming N layers, said set of pins comprising a first energizing pin and a second energizing pin each forming a phase input or output, each energizing pin having an energizing end extending from the associated conductive segment to outside the slot and each energizing end forming a phase output being electrically connected to another energizing end forming a phase input of a different phase in order to achieve a delta configuration. Again according to the present invention, a first set, formed of energizing pins of various phases placed in a first layer among the N layers, comprises at least one energizing end forming a phase input and at least one other energizing end forming a phase output and a second set, formed of energizing pins of various phases placed in a second layer among the N layers, which second layer is different from said first layer, comprises at least one energizing end forming a phase input and at least one other energizing end forming a phase output.

By virtue of the present invention, the phase inputs and outputs to be connected together are placed so that there is no longer any need to overlap or cross interconnection tracks to achieve the delta configuration. Thus, the structure of the interconnector is simplified and the bulk of the interconnector is limited.

According to one embodiment, for a given phase, each energizing pin of the first set is arranged in the same slot as an energizing pin of the second set. This makes it possible to simplify the winding scheme by limiting the use of special pins.

According to one embodiment, in a set comprising at least three first ends, the phase inputs/outputs are alternated along the circumference of the winding. This alternation makes it possible to avoid crossing interconnection tracks, while preventing one of said tracks from being required to protrude radially in order to make the electrical connection while avoiding one of the ends placed on the same stator circumference.

According to one embodiment, each set comprises one energizing end per phase of the phase system. In other words, each energizing end of a given set belongs to a different phase of said phase system.

According to one embodiment, for a phase system comprising a number Z of electrical phases, Z being an integer higher than or equal to 3, the energizing pins are placed, along the circumference of the stator, in the following order: (a) for the first set: the energizing end forming the output of the third phase, then the energizing end forming the input of the first phase, then the energizing end forming the output of the second phase, and for the second set: the energizing end forming the input of the third phase, then the energizing end forming the output of the first phase, then the energizing end forming the input of the second phase; or (b) for the first set: the energizing end forming the output of the second phase, then the energizing end forming the input of the first phase, then the energizing end forming the output of the third phase, and for the second set: the energizing end forming the input of the second phase, then the energizing end forming the output of the first phase, then the energizing end forming the input of the third phase; or (c) for the first set: the energizing end forming the output of the first phase, then the energizing end forming the input of the third phase, then the energizing end forming the output of the second phase, and for the second set: the energizing end forming the input of the first phase, then the energizing end forming the output of the third phase, then the energizing end forming the input of the second phase. According to one embodiment, each slot comprises N segments belonging to different pins. For example, a layer is formed by a single segment of one pin.

According to one embodiment, the energizing pins are placed in edge layers. By "edge layer" what is meant is a layer located at an internal or external radial end of the winding, i.e. a layer that is not central. In other words, the energizing pins are placed in layers respectively forming the internal periphery and external periphery of the winding. In particular, one of the sets is positioned in the external layer and the other set is positioned in the internal layer of the winding. This placement of the energizing pins in edge layers as opposed to central layers makes it possible to simplify the connections between the coils within the phase by making it possible to make these connections between central layers that are therefore adjacent.

According to one embodiment, for a given phase system, the energizing pins of the first set have a different shape from the shape of the energizing pins of the second set. For example, each energizing pin has a single conductive segment and two free ends. Again for example, the two free ends of an energizing pin of one of the sets extend in circumferential directions that are opposite each other and the two free ends of another energizing pin of the other set extend in the same circumferential direction.

According to one embodiment, the pins other than the energizing pins are each formed of two conductive segments that are connected to each other at one of their ends extending from the first axial end face of the body, which end is referred to as the first end, and that are connected to various pins at the other of their ends extending from the second axial end face of the body, which end is referred to as the second end, the first ends of the energizing pins extending from said first axial end face.

According to this embodiment, the winding comprises a first group of conductive pins the conductive segments of which are each placed in two distinct layers separated from each other by at least one intermediate layer, a second group of conductive pins the conductive segments of which are each placed in two distinct layers separated from each other by at least one intermediate layer, the layers comprising the first group of pins being distinct from the layers comprising the second group of pins, and a connecting pin for allowing the first group of pins to be connected to the second group of pins.

According to one embodiment, the conductive segments of the connecting pin are arranged in two adjacent layers. By "adjacent layers" what is meant is successive layers that are not separated by another layer. This makes it possible to simplify the insertion of the pins during the process employed to produce the winding and also to simplify the shape of the connecting pin.

According to one embodiment, the adjacent layers in which the conductive segments of the connecting pin are placed are central layers. By "central layer" what is meant is a layer that is flanked by two other layers and that is therefore not on the edge of the slot.

According to one embodiment, each conductive segment of an energizing pin is intended to be placed in one of the slots comprising a conductive segment of a connecting pin.

According to one embodiment, the energizing pins allow the winding to be connected to an electronic power and/or control module.

According to one embodiment, each phase comprises a plurality of conductive pins, at least one connecting pin and a number of energizing pins equal to twice the number of connecting pins.

According to one embodiment, the layers comprising the conductive segments of the conductive pins of the first group of pins are alternated with the layers comprising the conductive segments of the conductive pins of the second group of pins. For example, the internal radial layer comprises a conductive segment of a conductive pin of the first group of pins and the external radial layer comprises a conductive segment of a conductive pin of the second group of pins.

According to one embodiment, the conductive pins of the first group of pins respectively have different shapes from those of the conductive pins of the second group of pins.

According to one embodiment, the conductive pins of the first group of pins each have two free ends that respectively extend the two conductive segments, said ends being curved so as to approach each other in a circumferential direction.

According to one embodiment, the conductive pins of the second group of pins each have two free ends that respectively extend the two conductive segments, said ends being curved so as to diverge from each other in a circumferential direction.

Another subject of the present invention is an active portion of a rotary electric machine, which portion is in particular formed of a stator or of a rotor, which comprises an electric winding such as described above.

In addition, another subject of the present invention is a rotary electric machine comprising an active portion, which portion is in particular formed of a stator or of a rotor, which comprises an electric winding such as described above. The rotary electric machine may, advantageously, form an alternator, a starter-alternator, a reversible machine or an electric motor.

The present invention will possibly be better understood on reading the following detailed description of non-limiting examples of implementation thereof, and on studying the appended drawings.

FIG. 1 shows, schematically and partially, a cross-sectional view of a rotary electric machine according to one example of implementation of the invention.

FIG. 2 schematically shows a perspective view of the stator of FIG. 1.

FIG. 3 schematically shows a cross-sectional view of a radial plane of a portion of the stator of FIG. 2.

FIG. 4 schematically shows a perspective view of a conductive pin of the first group of pins of the stator of FIG. 2.

FIG. 5 schematically shows a perspective view of a conductive pin of the second group of pins of the stator of FIG. 2.

FIG. 6 schematically shows a perspective view of a connecting pin of the stator of FIG. 2.

FIG. 7 schematically shows a perspective view of a first energizing pin of the stator of FIG. 2.

FIG. 8 schematically shows a perspective view of a second energizing pin of the stator of FIG. 2.

FIG. 9 partially shows an electrical diagram of the winding of the stator of FIG. 2.

Figure 1:
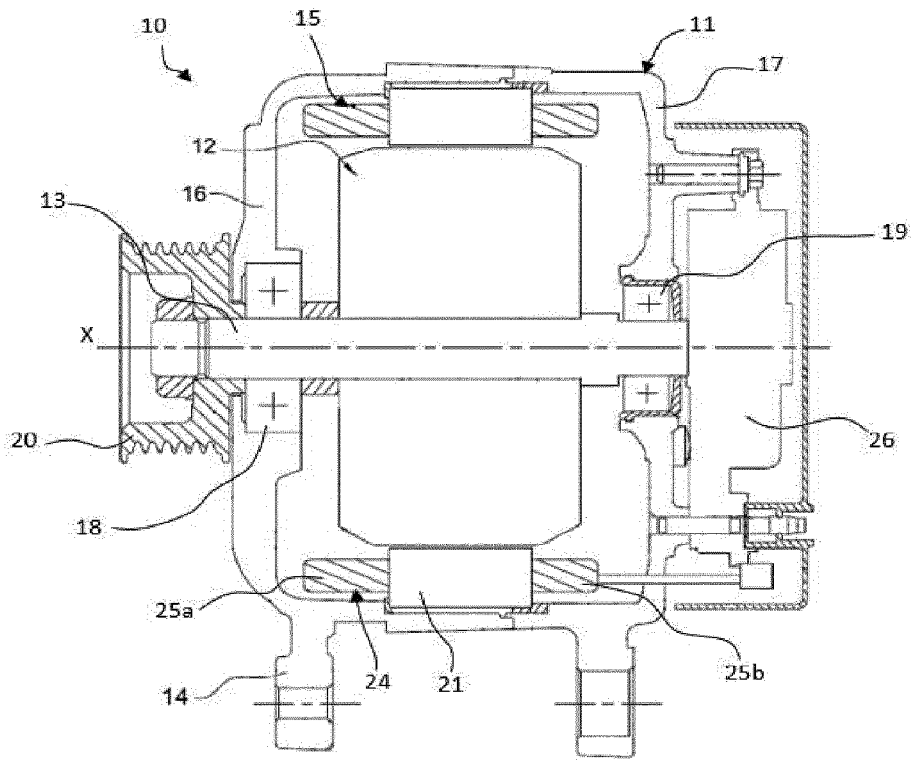

Elements that are identical or similar have been designated with the same references in all the figures. It will also be noted that the various figures are not necessarily to the same scale. FIG. 1 shows an example of a compact and polyphase rotary electric machine 10, in particular for a motor vehicle. This machine 10 converts mechanical energy into electrical energy, in alternator mode, and may operate in motor mode to convert electrical energy into mechanical energy. This rotary electric machine 10 is, for example, an alternator, a starter-alternator, a reversible machine or an electric motor.

In this example, the machine 10 comprises a casing 11. Inside this casing 11, the machine further comprises a shaft 13, a rotor 12 that is securely fastened to the shaft 13 so as to rotate as one therewith, and a stator 15 encircling the rotor 12. The rotary movement of the rotor 12 takes place about an axis X. In the rest of the description, the axial direction corresponds to the axis X, which passes through the center of the shaft 13, while radial orientations correspond to planes that are concurrent with, and in particular perpendicular to, the axis X. As regards radial directions, the denomination "internal" corresponds to an element oriented toward the axis, or that is closer to the axis with respect to a second element, and the denomination "external" designates a separation from the axis.

In this example, the casing 11 comprises a front flange 16 and a rear flange 17 that are joined together. These flanges 16, 17 are of hollow shape and bear, each, centrally a bearing coupled to a respective ball bearing 18, 19 in order to allow the shaft 13 to rotate. Furthermore, the casing 11 comprises fastening means 14 allowing the rotary electric machine 10 to be mounted in the vehicle.

A drive member 20 such as a pulley or a pinion may be fastened to a front end of the shaft 13. This member allows rotary movement to be transmitted to the shaft or the shaft to transmit its rotary movement. In the rest of the description, the denominations front/rear refer to this member. Thus, a front face is a face oriented in the direction of the member, whereas a rear face is a face oriented in the direction away from said member.

The front flange 16 and the rear flange 17 are here arranged so as to form a chamber through which a coolant such as water or oil is intended to flow. Alternatively, the flanges could comprise apertures for the passage of a cooling airflow generated by the rotation of at least one fan securely fastened to the rotor or shaft so as to rotate as one therewith.

In this example, the rotor 12 is formed of a stack of laminations housing permanent magnets forming magnetic poles. Alternatively, the rotor could be a claw-pole rotor comprising two claw poles and one rotor coil.

In this exemplary embodiment, the stator 15 comprises a body 21 formed of a stack of laminations that is provided with slots 22, these being equipped with slot insulators 23 with a view to installation of an electric winding 24. The winding passes through the slots in the body 21 and forms a front overhang 25a and a rear overhang 25b on either side of the body of the stator. Moreover, the winding 24 is formed of one or more phases that comprise at least one electrical conductor and that are electrically connected to an electronic assembly 26.

The electronic assembly 26, which is here mounted on the casing 11, comprises at least one electronic power module allowing at least one phase of the winding 24 to be driven. The power module forms a bridge voltage rectifier for converting the generated AC voltage into a DC voltage and vice versa. Alternatively, the electronic assembly could be located away from the machine.

Figure 2:
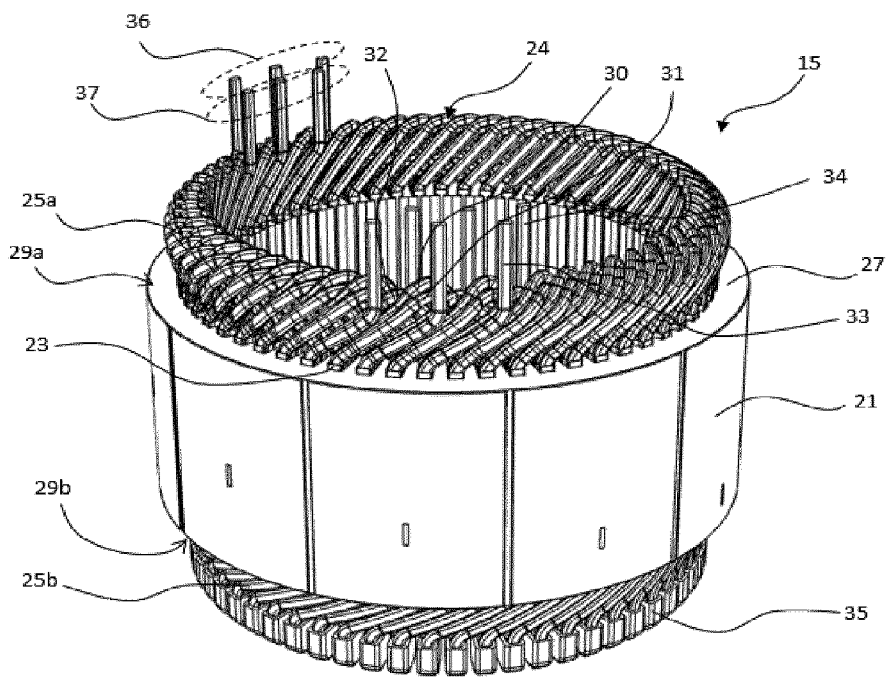
Figure 3:
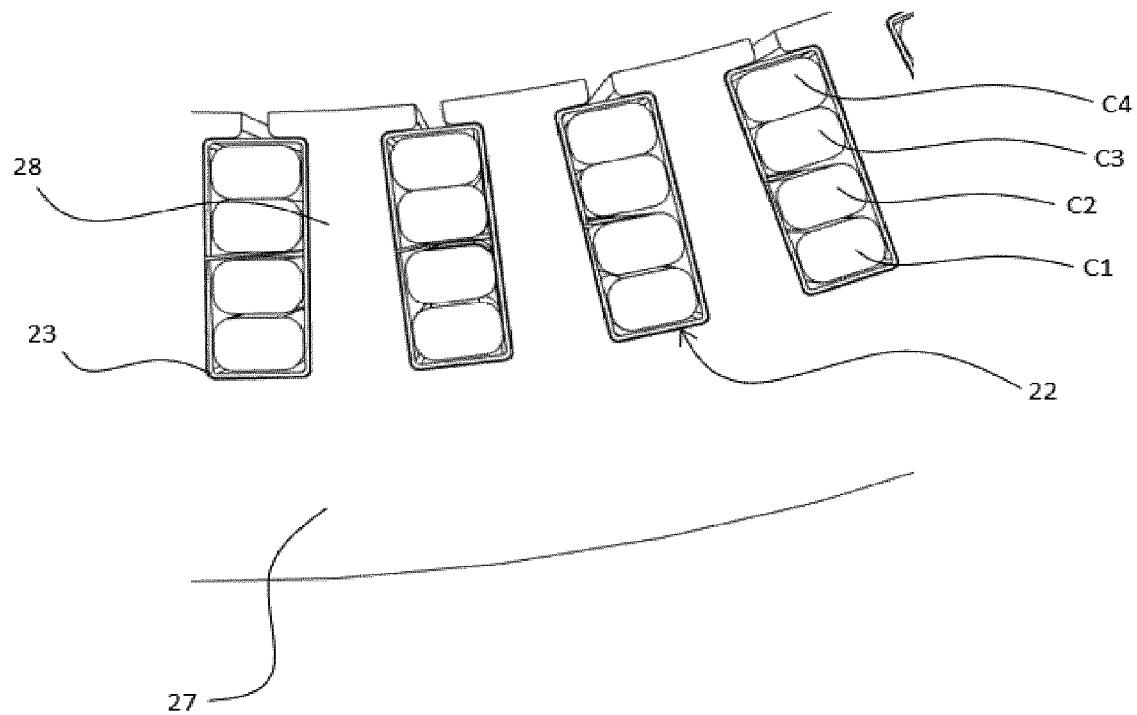

FIGS. 2 and 3 show the stator 15 in more detail. The body of the stator 21 is formed of a yoke 27 of annular shape about the axis X and of a plurality of teeth 28 extending radially in the direction of the center of the stator from the yoke, and in particular here from a lateral face forming an internal wall of the yoke 27. Angularly the teeth 28 are regularly distributed around the perimeter of the annular body, with successive spaces left between them so as to define the slots 22 that lie in succession around the perimeter of the annular body of the stator, each slot being bounded by two successive teeth. According to the present example, the teeth define 48 slots that are distributed along the circumference of the stator body, these slots being arranged to form a holder for the electric winding 24. As a variant, a different number of slots may be used, such as 96, 84, 72, or 60 slots. It will be understood that this number in particular depends on the application of the machine, on the diameter of the stator and on the number of poles of the rotor.

In the axial direction, i.e. the direction parallel to the axis X, the slots 22 open onto a first axial end face 29a and a second axial end face 29b of the stator body 21. In other words, the slots pass axially right through the body and open onto the two opposite axial end faces of the stator. By the terms "axial end faces", what is meant is faces perpendicular or substantially perpendicular to the axis of revolution X of the stator.

The winding 24 is formed of a plurality of pins that are electrically connected to one another to form electrical paths forming the phases of the winding. In this example, each phase comprises a plurality of conductive pins 30, 31, one connecting pin 32 and two energizing pins 33, 34. As will be described in more detail below with reference to FIGS. 4 and 5, each conductive pin 30, 31 is formed of two conductive segments 30A, 30B, 31A, 31B that extend axially in the slots 22 and that are, to this end, substantially parallel to each other. Said conductive segments are connected to each other by way of a dog-legged junction 30C, 31C that is also conductive so as to form an electrical continuity. As will be described in more detail below with reference to FIG. 6, the connecting pin 32 is formed of two conductive segments 32A, 32B that extend axially in the slots 22 and that are, to this end, substantially parallel to each other. Said conductive segments are connected to each other by way of a dog-legged junction 32C that is also conductive so as to form an electrical continuity. The conductive segments 30A, 30B, 31A, 31B, 32A, 32B of a given pin 30, 31, 32 are placed in two separate slots.

Each dog-legged junction 30C, 31C, 32C may have two inclined pieces 30D, 31D, 32D that meet to form a vertex 30E, 31E, 32E. The dog-legged junctions 30C, 31C, 32C are here of one-piece construction and in particular are integrally formed with and made of the same material as the associated conductive segments. Thus, each pin 30, 31, 32 is unitarily formed. Alternatively, the dog-legged junctions may be formed in two portions that are connected together for example by welding, each portion of the dog-legged junction being integrally formed with and made of the same material as the associated conductive segment. Thus, each pin 30, 31, 32 is formed by two sub-pins.

As will be described in more detail below with reference to FIGS. 7 and 8, the energizing pins 33, 34 are each formed of a conductive segment 33A, 34A that extends axially in the slots 22.

As may be seen in FIG. 3, the various conductive segments placed in the same slot are superposed in order to form a stack of N layers Ci, it being understood that these N layers are present in each of the slots so that annular circles that are substantially coaxial with one another are formed on the perimeter of the stator. For example, these layers are four in number and numbered from C1 to C4, according to the order in which they are stacked in the slots 22. The first layer C1 corresponds to the external layer, the second layer C2 corresponds to an external central layer directly adjacent to the first layer C1, the third layer C3 corresponds to the internal central layer directly adjacent to the second layer C2 and the fourth layer C4 corresponds to the internal layer. The layers C1 and C4 form edge layers and the layers C2 and C3 form central layers. The first layer C1 is thus occupied by the conductive segment closest to the yoke 27 and the layer C4 is thus occupied by the conductive segment closest to the slot aperture, i.e. closest to the axis X. Of course, the invention is not limited to this single embodiment and hence a higher number of conductive segments may be stacked in each slot, 6, 8 or 10 conductors for example. For example, a layer is formed by a single conductive segment. Thus, each slot 22 comprises N conductive segments that are radially aligned with one another in a single line and that each form one layer Ci. In the illustrated example, the conductive segments each have a substantially rectangular cross section facilitating stacking thereof in the slot.

Figure 4:
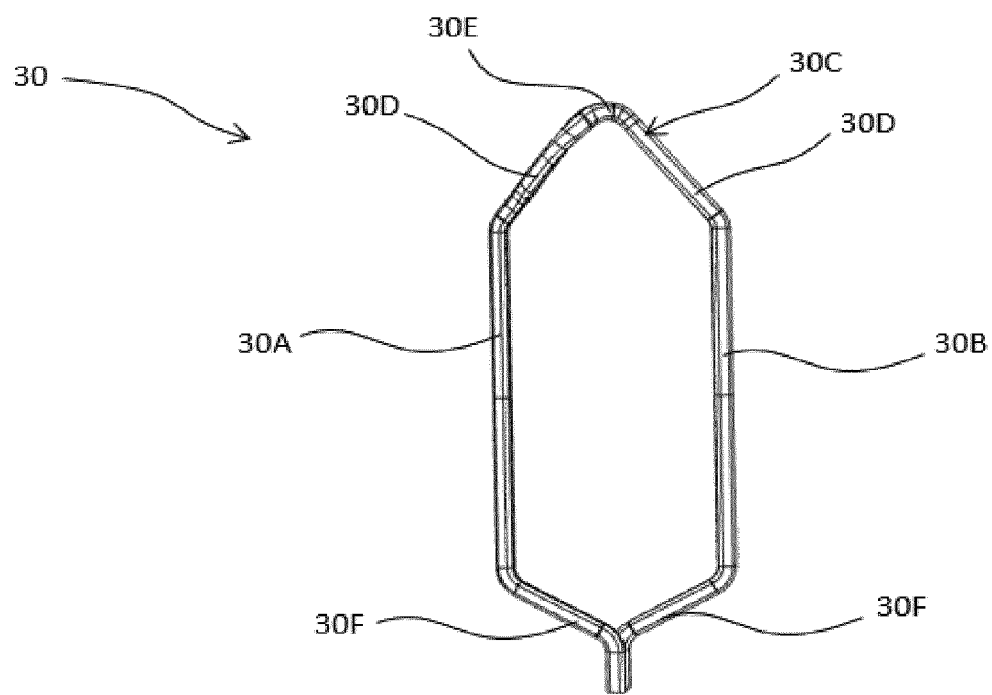

FIGS. 4, 5, 6 and 7 illustrate the various shapes of the pins forming the electric winding 24. The description below is given in relation to one phase of the electric winding, but those skilled in the art will understand that all the phases are formed identically. The conductive pins 30, 31 forming the first or second groups of pins differ in the free ends 30F, 31F of the conductive segments, which are axially opposite to the dog-legged junctions 30C, 31C. FIG. 4 shows a conductive pin 30 of the first group of pins, all the pins 30 of the first group being of identical shape. This conductive pin 30 is characterized by two free conductive-segment ends 30F that are curved so as to approach each other. More particularly, the free ends 30F of the conductive segments are bent so as to overlap each other in a radial direction. The spacing between the two free ends 30F of the conductive segments of a given pin 30 is smaller than the spacing between the straight pieces of these two conductive segments 30A, 30B housed in the slots.

Figure 5:
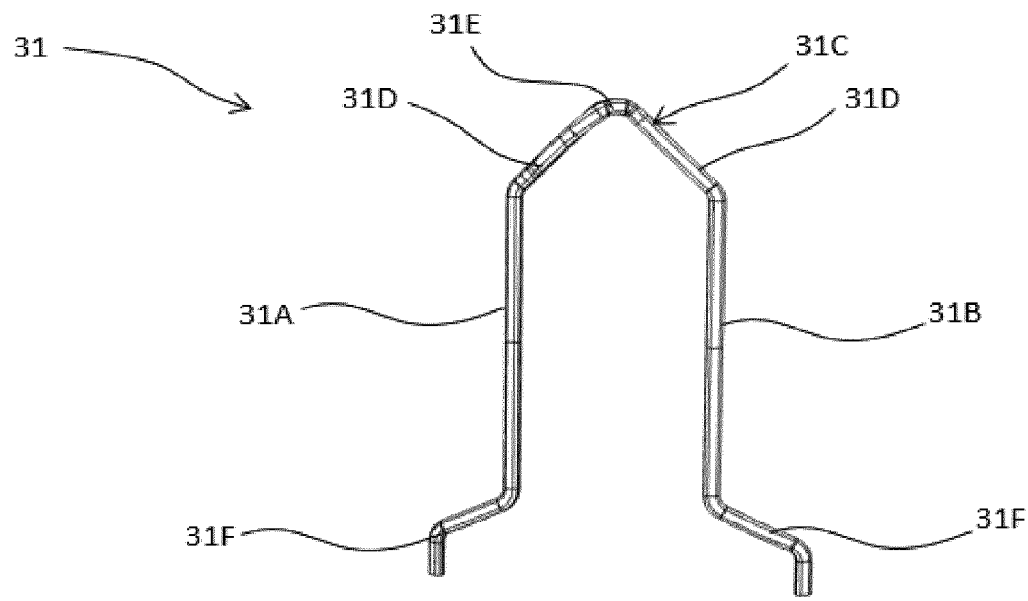

FIG. 5 represents a conductive pin 31 of the second group of pins, all the pins 31 of the second group being of identical shape. This conductive pin 31 is characterized by two free conductive-segment ends 31F that are curved so as to diverge from each other. The spacing between the two free ends 31F of the conductive segments of a given pin 31 is larger than the spacing between the straight pieces of these two conductive segments 31A, 31B housed in the slots. More particularly, the conductive segments 31A, 31B of a given pin are spaced apart by an interval P so as to be respectively inserted into a slot E and into a slot E+P, and the free ends 31F of these conductive segments are spaced apart by an interval 2P.

Figure 6:
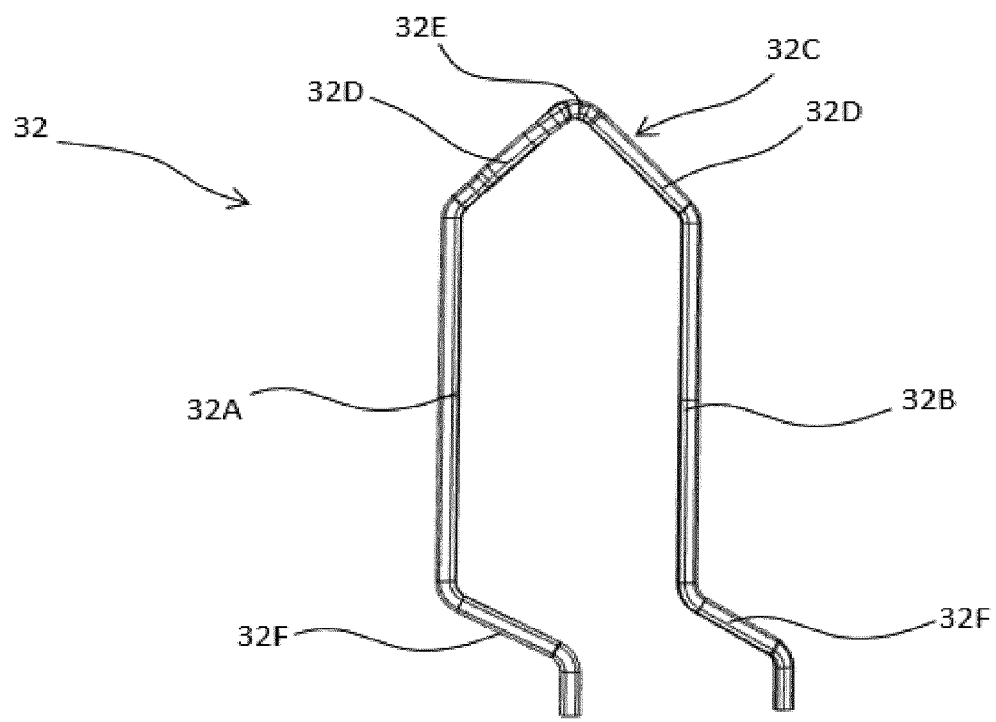

FIG. 6 shows a connecting pin 32 that is in particular characterized by two free conductive-segment ends 32F that are curved so as to maintain the same spacing as that of the conductive segments 32A, 32B. The spacing between the two free ends 32F of the conductive segments of a given pin 32 is similar to the spacing between the straight pieces of these two conductive segments 32A, 32B housed in the slots. More particularly, the conductive segments 32A, 32B of a given pin are spaced apart by an interval P so as to be respectively inserted into a slot E and into a slot E+P, and the free ends 32F of these conductive segments are spaced apart by the same interval P.

Figure 7:
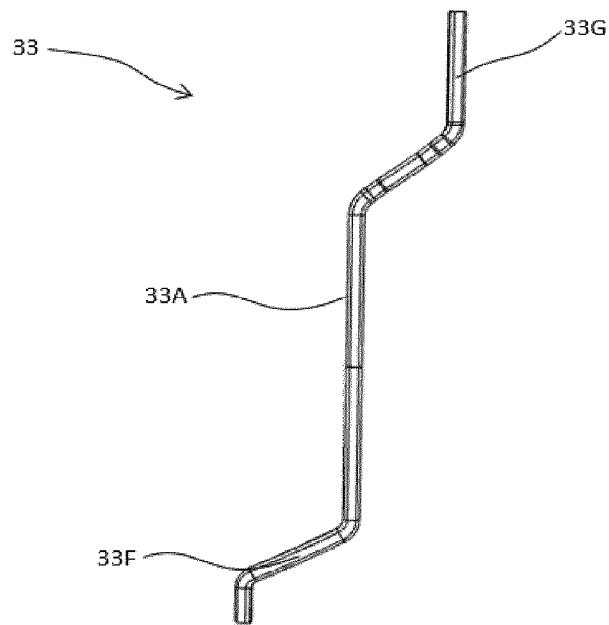

FIG. 7 shows a first energizing pin 33, which comprises a single conductive segment 33A, a first end 33G, referred to as the energizing end, and a second end 33F, referred to as the free end. The free end 33F is placed on the same side of the stator as the free ends 30F, 31F, 32F of the other pins, and the energizing end 33G is placed on the axially opposite side, i.e. on the side of the dog-legged junctions 30C, 31C, 32C. The ends 33F, 33G are bent in opposite circumferential directions, i.e. said ends are not axially superposed.

Figure 8:
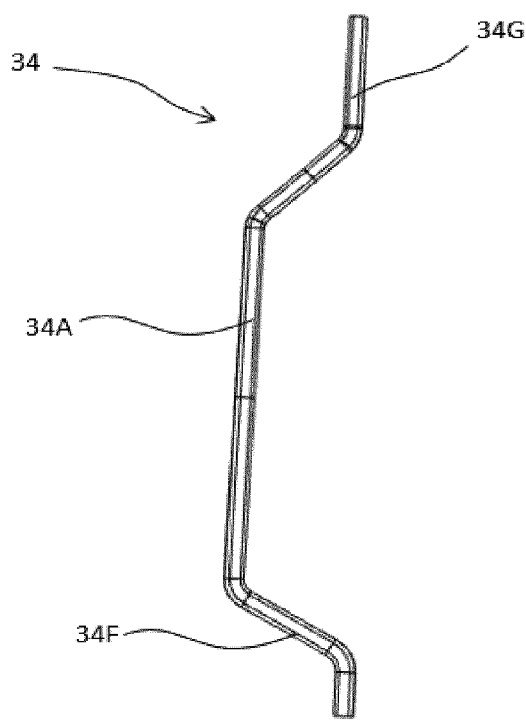

FIG. 8 shows a second energizing pin 34, which comprises a single conductive segment 34A, a first end 33G, referred to as the energizing end, and a second end 33F, referred to as the free end. The free end 34F is placed on the same side of the stator as the free ends 30F, 31F, 32F of the other pins, and the energizing end 34G is placed on the axially opposite side, i.e. on the side of the dog-legged junctions 30C, 31C, 32C. The ends 34F, 34G are bent in the same direction, i.e. said ends are axially superposed.

As may be seen in FIGS. 2 and 9 in particular, each pin 30, 31, 32, 33, 34 is arranged so that, on the one hand, its conductive segments extend into two separate slots E and E+P, which are separated by an interval P, and so that, on the other hand, each dog-legged junction is placed above the first axial end face 29a, whereas the free ends are placed below the second axial end face 29b and are interconnected so as to generate an electrical continuity in the winding from one pin to the next. As will be described below with reference in particular to FIG. 9, the free conductive-segment ends arranged in a first layer C1 and the free conductive-segment ends arranged in a second layer C2 are interconnected and the free conductive-segment ends arranged in a third layer C3 and the free conductive-segment ends arranged in a fourth layer C4 are interconnected. These connections are for example made by welding. Thus, the conductive segments 30A, 30B, 31A, 31B, 32A, 32B, 33A, 34A of a given pin are connected to each other at one of their ends by a dog-legged junction 30C, 31C, 32C and, each, to another pin at their free end 30F, 31F, 32F, 33F, 34F.

The first group of conductive pins 30 form a group referred to as the external group, which comprises pins 30 the conductive segments 30A, 30B of which are housed in the slots so as to form the external first layer C1 and the internal central third layer C3. The second group of conductive pins 31 form a group referred to as the internal group, which comprises pins 31 the conductive segments 31A, 31B of which are housed in the slots so as to form the internal fourth layer C4 and the external central second layer C2.

Figure 9:
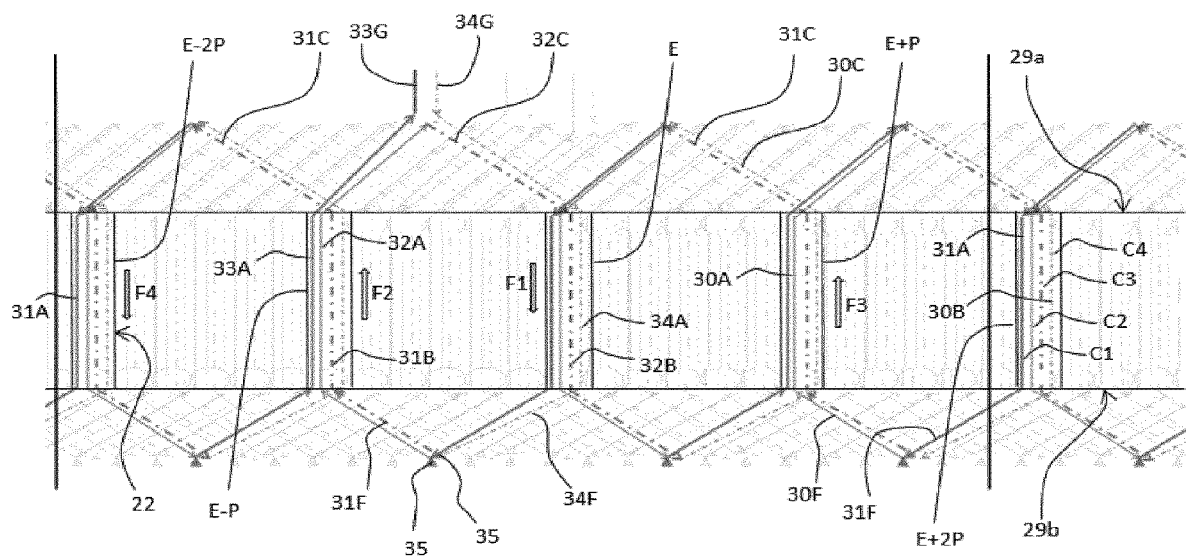

As may be seen in FIGS. 2 and 9, the two groups of pins are interlaced, i.e. arranged so that one of the conductive segments of the pins 30 of the external group is located in the slots further to the interior than one of the conductive segments of the pins 31 of the internal group. More particularly, a conductive pin 30 belonging to the first group is arranged in the stator so as to have one conductive segment 30A occupying a first layer C1 in a slot E and one conductive segment 30B occupying a third layer C3 in a slot E+P. Similarly, a conductive pin 31 belonging to the second group is arranged in the stator so as to have one conductive segment 31A occupying a second layer C2 in the slot E and one conductive segment 31B occupying a fourth layer C4 in a slot E+P. In other words, the conductive pins 30, 31 are arranged so that the conductive segments of a given conductive pin occupy distinct slots with a radial offset of two layers from one slot to the next, or in other words with the interposition of an intermediate layer between the two layers occupied by the conductive segments of this given pin. This radial offset corresponds to the interposition of a conductive segment belonging to a conductive pin of the other group. The result of this particular arrangement is an alignment of the dog-legged junctions above the first axial end face 29a of the stator body 21 such that the adjacent dog-legged junctions are substantially parallel to one another. This increases the compactness of the overhang.

These two groups of conductive pins 30, 31 respectively form continuous electrical paths that are independent of each other. To ensure the electrical continuity within the phase, a connecting pin 32 is arranged to electrically connect the first group of conductive pins 30 to the second group of conductive pins 31, and thus to form a single electrical path and to form one phase of the electric winding 24. Thus, this connecting pin 32 closes the electrical circuit and allows an appropriate flow of current through the winding, in particular in order that, on the one hand, the current flows in the same direction in each of the conductive segments housed in a given slot, and that, on the other hand, the current flows generally in one direction in one slot and in the opposite direction in the slots spaced apart therefrom by an interval P and −P.

In the example illustrated in FIG. 9, the first conductive segment 32A of the connecting pin 32 is placed in one of the layers associated with the first group of conductive pins 30 and the second conductive segment 32B of said pin is placed in one of the layers associated with the second group of conductive pins 31. This arrangement makes the winding advantageous with respect to electrical connection. Specifically, it allows all the conductive pins 30, 31 to be connected via a U-shaped connecting pin 32, i.e. a pin the shape of which is similar to that of the conductive pins, with two conductive segments connected to each other by a dog-legged junction. With this arrangement, the electric winding 24 therefore does not comprise any special pins allowing the direction of the current to be inverted in order to respect the direction of flow of the electric current in the slots. Thus, this makes it possible to simplify the electric winding and its assembly process.

In particular in this example, the first conductive segment 32A of the connecting pin 32 is placed in the third layer C3, and the second conductive segment 32B of said pin is placed in the second layer C2. Thus, the conductive segments 32A, 32B of the connecting pin are arranged in two different slots in two layers that are adjacent in a radial direction, i.e. there is no intermediate layer between the two layers occupied by the conductive segments of this given pin 32. This allows the dog-legged junction 32C of the connecting pin to be integrated into the overhang and the height of the overhang not to be increased by the passage over another pin piece.

As may be seen in FIGS. 2, 3 and 9, energizing pins 33, 34 are placed in a slot so that their respective conductive segments 33A, 34A are placed in a layer adjacent to the layer of the same slot comprising the conductive segment 32A, 32B of a connecting pin 32. In other words, for each conductive segment of a connecting pin 32 occupying a second layer C2 in a slot E, provision is made for a conductive segment 33A of an energizing pin 33 to occupy a first layer C1 in said slot E. Similarly, for each conductive segment of a connecting pin 32 occupying a third layer C3 in a slot E+P, provision is made for a conductive segment 34A of an energizing pin 34 to occupy a fourth layer C4 in said slot E+P, which is spaced apart by an interval P from said slot E. The energizing pins 33, 34 are thus placed in edge layers so as to flank the connecting pin 32 of the same phase the conductive segments 32A, 32B of which are placed in central layers.

It will be understood that each connecting pin 32 is associated with a pair of energizing pins 33, 34 such as may be seen in FIG. 2 in particular. Thus, an electric winding 24 comprising six phases also comprises six pairs of energizing pins 33, namely six first energizing pins 33 and six second energizing pins 34, and six connecting pins 32. It will be understood that the number of conductive pins 30, 31 depends on the number of slots in the stator and therefore on the desired application of the rotary electric machine, and in particular on the desired performance and the available space, remembering that there are as many conductive pins 30 in the first group as conductive pins 31 in the second group.

The energizing ends 33G, 34G form current inputs and/or outputs of the corresponding phase. More precisely, for one phase, one end 33G, 34G of one of the energizing pins is connected, directly or via an interconnection device, to one end 33G, 34G of an energizing pin of another phase of the winding. In particular here, the output of one phase is connected to the input of another phase of the same phase system in order to achieve a delta configuration. Each of these connections between the phase inputs and outputs is also connected to a current source in particular comprised in an electronic power and/or control module of the electronic assembly 26.

The energizing ends 33G, 34G are arranged along the electric winding 24 so as to be grouped into a first set 36 and a second set 37 for each phase system. In this example, the energizing ends of a given set are placed in the same layer Ci of the slot. For example here, as illustrated in FIG. 2 or in FIGS. 10, 11, 12, the first set 36 comprises energizing pins placed in the external layer C1 and the second set comprises energizing pins placed in the internal layer C4. In one alternative embodiment, it is possible to have the energizing pins of the first set placed in the internal layer C4, and the energizing pins of the second set placed in the external layer C1. It is also possible to place the energizing pins in the central layers C2, C3.

In the example described here, the electric winding 24 comprises two systems each comprising three phases. Thus, the winding here comprises two first sets 36 and two second sets 37 each comprising three energizing ends 33G, 34G. The structures of the sets may be identical or different from one phase system to another. Each of the sets 36, 37 comprises at least one energizing end forming a phase input and one energizing end forming a phase output. In particular, in this example, each set 36, 37 comprises either two energizing ends forming phase inputs and one energizing end forming a phase output or two energizing ends forming phase outputs and one energizing end forming a phase input. The sets of a given phase system have architectures that are complementary to one another. For example, if the first set comprises two energizing ends forming phase inputs and one energizing end forming a phase output then the second set comprises two energizing ends forming phase outputs and one energizing end forming a phase input. In addition, each set comprises one energizing end per phase of said phase system. Thus, for a given set, each energizing end belongs to a different phase.

Figure 10:
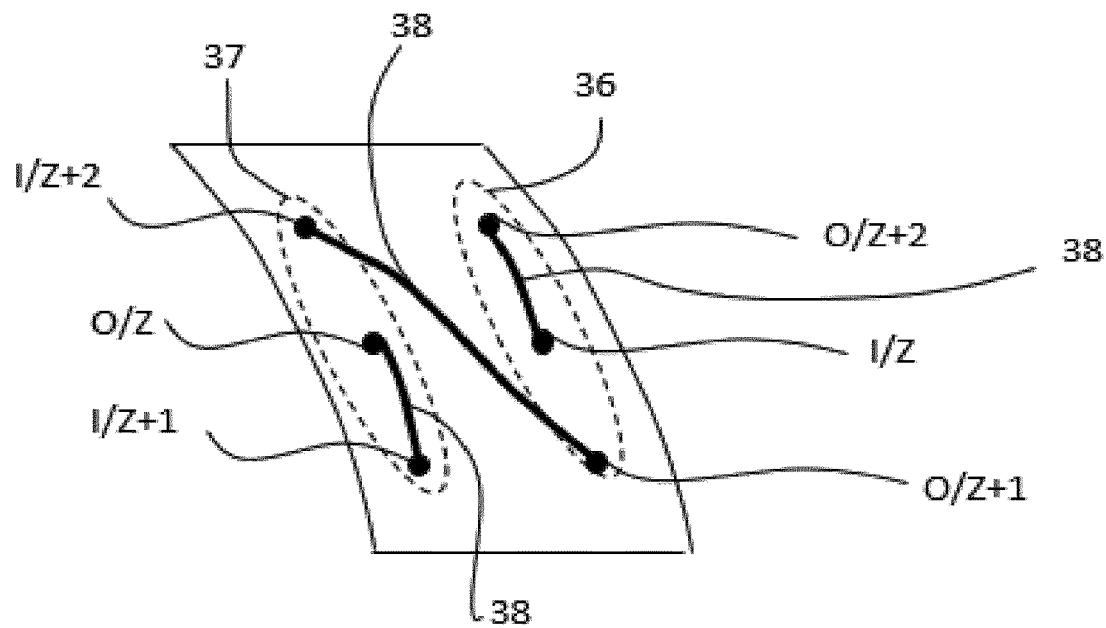
FIG. 10 shows, respectively and schematically, an axial view from above of a portion of the winding comprising interconnection tracks according to a first embodiment of the stator.
Figure 11:
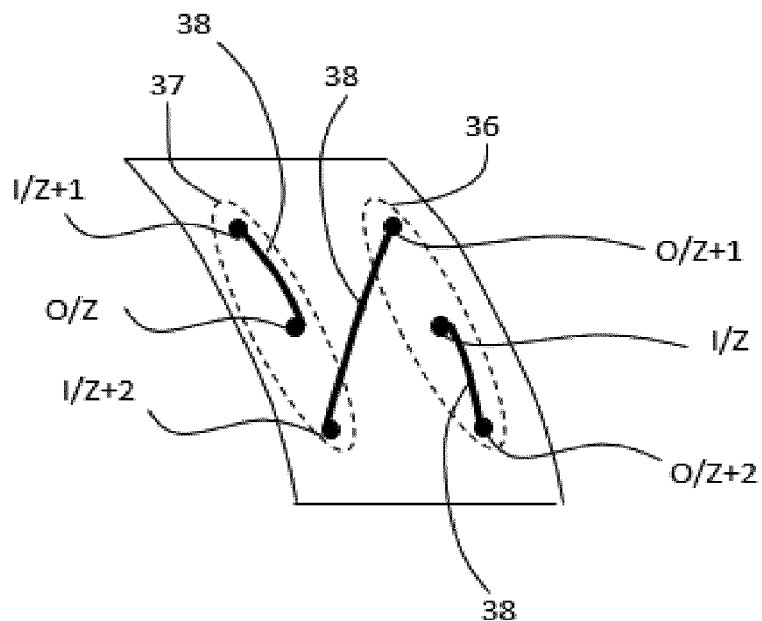
FIG. 11 shows, respectively and schematically, an axial view from above of a portion of the winding comprising interconnection tracks according to a second embodiment of the stator.
Figure 12:
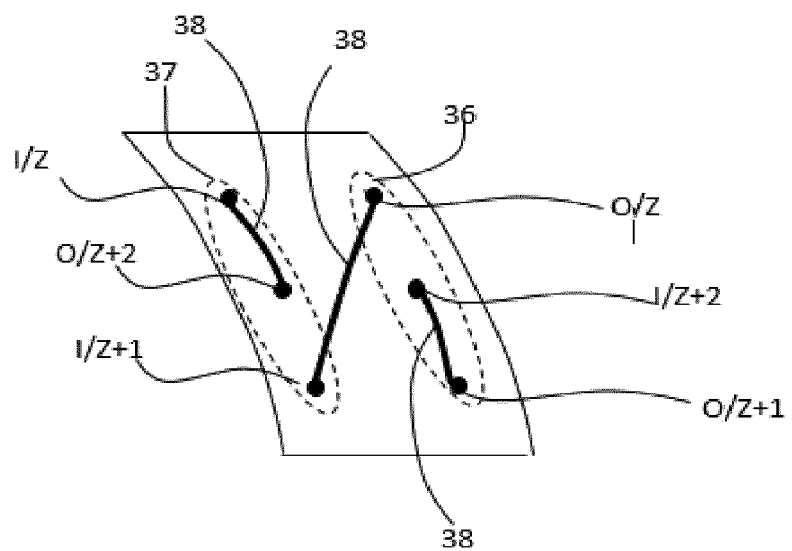
FIG. 12 shows, respectively and schematically, an axial view from above of a portion of the winding comprising interconnection tracks according to a third embodiment of the stator.

FIGS. 10, 11 and 12 each show one embodiment in which is illustrated a portion of the winding of the stator, and in particular a schematic view from above, in an axial direction, of a piece of the overhang from which the energizing ends 33G, 34G extend. In these examples, the first set 36 comprises two energizing ends forming phase outputs and one energizing end forming a phase input and the second set 37 comprises two energizing ends forming phase inputs and one energizing end forming a phase output. The energizing ends are arranged in the same layer of the slot and therefore extend over one circumferential piece of the winding.

In this exemplary embodiment, within a given set, the ends forming the phase outputs/inputs are alternated, in a circumferential direction. In other words, for a set comprising two phase outputs and one phase input, said phase input is placed circumferentially between the phase outputs. Similarly, for a set comprising two phase inputs and one phase output, said phase output is placed circumferentially between the phase inputs.

Preferably, the distance, in a circumferential direction, between the energizing ends is identical within a given set 36, 37.

For example, a given set comprises only first energizing pins 33 or only second energizing pins 34. Thus, the shape of the energizing pins forming the given set is identical but said energizing pins each form either a phase input or a phase output. For example, here, as illustrated in FIGS. 2 and 9, the second set 37 comprises second energizing pins 34 arranged in the internal layer C4 and the first set 36 comprises first energizing pins 33 arranged in the external layer C1.

In this example, a slot comprises conductive segments of different pins belonging to the same phase. Again in this example, the energizing ends 33G, 34G of a given phase are arranged so that their associated conductive segment 33A, 34A is placed in the same slot. Said energizing ends 33G, 34G of a given phase are then aligned radially. Thus, for a phase, if the first set comprises the energizing end forming the phase output then the second set comprises the energizing end forming the phase input.

FIG. 10 illustrates a first example in which the first set 36 comprises, in the following order: the energizing end forming the output O/Z+2 of the third phase, then the energizing end forming the input I/Z of the first phase, then the energizing end forming the output O/Z+1 of the second phase. The second set 37, which is complementary to said first set 36, then comprises, in the following order: the energizing end forming the input I/Z+2 of the third phase, then the energizing end forming the output O/Z of the first phase, then the energizing end forming the input I/Z+1 of the second phase.

To achieve the delta configuration, the energizing ends 33G, 34G are interconnected, here for example, by means of an interconnection track 38. Each interconnection track is for example welded to the associated energizing ends and may comprise a piece for connection with a module of the electronic assembly 26. The tracks 38 are for example overmolded in an electrically insulating material to make it easier to make these connections and to guarantee a good electrical insulation between them and between said tracks and the vertices 30E, 31E, 32E of the other pins of the winding.

More particularly, the energizing end forming the phase input I/Z+2 of the third phase is connected to the energizing end forming the phase output O/Z+1 of the second phase, the energizing end forming the phase output O/Z of the first phase is connected to the energizing end forming the phase input I/Z+1 of the second phase, and the energizing end forming the phase output O/Z+2 of the third phase is connected to the energizing end forming the phase input I/Z of the first phase. As may be seen clearly in FIG. 10, it is possible to make these connections without overlap between the tracks 38.

FIG. 11 illustrates a second example in which the first set 36 comprises, in the following order: the energizing end forming the output O/Z+1 of the second phase, then the energizing end forming the input I/Z of the first phase, then the energizing end forming the output O/Z+2 of the third phase. The second set 37, which is complementary to said first set 36, then comprises, in the following order: the energizing end forming the input I/Z+1 of the second phase, then the energizing end forming the output O/Z of the first phase, then the energizing end forming the input I/Z+2 of the third phase.

As explained above with reference to FIG. 10, the delta configuration is for example achieved by means of an interconnection track 38. In particular, here, the energizing end forming the phase input I/Z+1 of the second phase is connected to the energizing end forming the phase output O/Z of the first phase, the energizing end forming the phase output O/Z+1 of the second phase is connected to the energizing end forming the phase input I/Z+2 of the third phase, and the energizing end forming the phase output O/Z+2 of the third phase is connected to the energizing end forming the phase input I/Z of the first phase. As may be seen clearly in FIG. 11, it is possible to make these connections without overlap between the tracks 38.

Similarly, FIG. 12 illustrates a third example in which the first set 36 comprises, in the following order: the energizing end forming the output O/Z of the first phase, then the energizing end forming the input I/Z+2 of the third phase, then the energizing end forming the output O/Z+1 of the second phase. The second set 37, which is complementary to said first set 36, then comprises, in the following order: the energizing end forming the input I/Z of the first phase, then the energizing end forming the output O/Z+2 of the third phase, then the energizing end forming the input I/Z+1 of the second phase.

As explained above, the delta configuration is for example achieved by means of an interconnection track 38. In particular, here, the energizing end forming the phase input I/Z+1 of the second phase is connected to the energizing end forming the phase output O/Z of the first phase, the energizing end forming the phase output O/Z+1 of the second phase is connected to the energizing end forming the phase input I/Z+2 of the third phase, and the energizing end forming the phase output O/Z+2 of the third phase is connected to the energizing end forming the phase input I/Z of the first phase. As may be seen clearly in FIG. 12, it is possible to make these connections without overlap between the tracks 38. FIG. 9 shows a schematic illustration of a winding portion in accordance with what has been described above. To make the description simple to read, the number of slots has been limited, but it will be understood that what follows will be able to be extended without difficulty by a person skilled in the art to complete the winding, the other slots of the stator also comprising stacks of conductive segments. Also to make the description simple to read, the pins of a given phase have been shown in bold, the pins of the other phases being shown see-through.

More precisely, for the electrical circuit illustrated in FIG. 9, current is introduced, in a first direction of orientation, into the winding 24 via the energizing end 34G of a first energizing pin 34 forming the input of the electric current of the phase, which as illustrated is located on the side of the first axial end face 29a. Its course will be described in more detail via the numbered arrows Fi, in order to illustrate the fact that the current flows, through stacked conductive segments, in the same direction on one given slot, and in an opposite direction on a slot spaced apart by an interval P or −P therefrom. It will be noted that the slot E+P is separated from the slot E by a predetermined interval P, in a first direction of orientation. In the present example of a dual three-phase electric winding with one slot per pole and per phase, the interval P corresponds to the interposition of five slots between a slot E and a slot E+P.

The current flows through the conductive segment 34A housed in a slot E from the first axial end face 29a to the second axial end face 29b (arrow F1). This conductive segment 34A, which is arranged so as to form part of the fourth layer C4 in this slot E, has, at its free end 34F, on the side of the second axial end face 29b, a shape that is bent back on itself and similar to that of a conductive segment 30F of a conductive pin 30 of the first group of pins that it replaces in this layer.

The free end 34F of the energizing pin is connected, below the second axial end face 29b of the stator, to the free end 31F of a conductive pin 31 of the second group of pins, one of the conductive segments of which occupies the third layer C3 in a slot E−P. The two free ends 34F, 31F are arranged beside each other in particular in a radial direction and are electrically connected at a contact point 35, this contact point being able to be produced by welding, so as to allow an electric current to flow through the conductive segments, in the same direction, in each slot. The direction of flow of the current has been shown by arrows overlaid on the conductive pins. As a result, the current is made to flow, from the second axial end face 29b to the first axial end face 29a, via the conductive segment 31B in the third layer C3 of the slot E−P, such as illustrated by the arrow F2.

The conductive segment 31B, which occupies the third layer C3 in the slot E−P, forms part of a conductive pin 31 belonging to the second group of pins, and hence this conductive segment is extended, above the first axial end face 29a, by a dog-legged junction 31C, and then by a conductive segment 31A occupying the first layer C1 in a slot E−2P separated by a space P from the slot E−P, in the direction opposite to the first direction of orientation. Thus, the current is made to flow, from the first axial end face 29a to the second axial end face 29b, via the conductive segment 31A in the first layer C1 of the slot E−2P, such as illustrated by the arrow F4.

It will be understood that, for a given phase, the pins are successively interlaced around the entire perimeter of the stator, and, to make the description of FIG. 9 simpler to read, the above description will continue, after the current has flowed substantially all the way around the stator, from level with the solid line placed between the slots E+P and E+2P in FIG. 9. At this stage, the continuity of the winding is achieved by connecting the free end 31F of the conductive segment 31A occupying the first layer C1 in the slot E+2P to the free end 30F of a conductive segment 30A occupying the second layer C2 in the slot E+P, said ends 31F, 30F being arranged side by side in a radial direction and being electrically connected by a contact point 35 below the second axial end face 29b.

The current is thus made to make a loop in the first direction of orientation and to flow from the second axial end face 29b toward the first axial end face 29a, in the second layer C2 of the slot E+P, via the conductive segment 30A of a conductive pin 30 of the first group of pins, such as illustrated by the arrow F3, then to flow through the dog-legged junction 30C of said conductive pin 30 then to flow from the first axial end face 29a toward the second axial end face 29b, in the fourth layer C4 of the slot E+2P, via the conductive segment 30B of said conductive pin 30. It may be seen from the above that in the slot E+2P, the currents flowing through the first layer C1 and through the fourth layer C4 both flow in the same direction.

The current then flows successively in a direction opposite to the first direction of orientation, via a contact point 35, to a conductive segment 31B housed in the third layer C3 of the slot E+P then via the dog-legged junction 31C to a conductive segment 31A of the same conductive pin 31 in the first layer C1 of the slot E.

At this stage, the current is made to flow, following a contact point 35, from the second axial end face 29b toward the first axial end face 29a in the first direction of orientation, in the second layer C2 of the slot E, via a conductive segment 32A of the connecting pin 32 then, following the dog-legged junction 32C, from the first axial end face 29a toward the second axial end face 29b, in the third layer C3 of the slot E+P, via a conductive segment 32B of said connecting pin 32.

The continuity of the winding is then achieved, in accordance with what has just been described, by passing from a conductive segment of the first layer C1 to the third layer C3 and from the fourth layer C4 to the second layer C2 on the side of the dog-legged junctions forming part of the conductive pins, and by passing from the second layer C2 to the first layer C1 and from the third layer C3 to the fourth layer C4 via contact points 35, in particular welds, below the second axial end face 29b, so that the current flows in the same direction in each slot.

The current is then made to flow, in accordance with what has been described above, from one conductive pin to the next, until it flows into the slot E−P in the first layer C1, in which is arranged the conductive segment 33A of the energizing pin 33 forming via its energizing end 33G the current output of the illustrated phase.

The present invention is applicable in particular in the field of alternators, starter-alternators, electric motors or even reversible machines, but it could also be applied to any type of rotary machine.

Of course, the above description has been given purely by way of example and does not limit the scope of the present invention; the replacement of the various elements with any other equivalents would not constitute a departure from said scope.

The invention claimed is:

1. An electric winding for an active portion, which portion is in particular formed of a stator or of a rotor, of a rotary electric machine, the active portion having a body comprising an annular yoke about an axis and a plurality of teeth that extend from a lateral face of the yoke in a radial direction so as to define slots, said slots opening onto a first axial end face and onto a second axial end face of the body; the electric winding having at least one phase system comprising a plurality of electrical phases each comprising a set of pins that are electrically connected to one another and that each have at least one conductive segment, said conductive segments intended to be housed in the same slot forming N layers (Ci), said set of pins comprising a first energizing pin and a second energizing pin each forming a phase input or output, each energizing pin having an energizing end extending from the associated conductive segment to outside the slot and each energizing end forming a phase output being electrically connected to another energizing end forming a phase input of a different phase in order to achieve a delta configuration, the winding being wherein a first set, formed of energizing pins of various phases placed in a first layer among the N layers (Ci), comprises at least one energizing end forming a phase input and at least one other energizing end forming a phase output and in that a second set, formed of energizing pins of various phases placed in a second layer among the N layers (Ci), which second layer is different from said first layer, comprises at least one energizing end forming a phase input and at least one other energizing end forming a phase output,
- wherein, in a set comprising at least three first ends, the phase inputs/outputs are alternated along the circumference of the winding, and,
- wherein, for a phase system comprising a number Z of electrical phases, Z being an integer higher than or equal to 3, the energizing pins are placed, along the circumference of the stator, in the following order:
  a. for the first set: the energizing end forming the output (O/Z+2) of the third phase, then the energizing end forming the input (I/Z) of the first phase, then the energizing end forming the output (O/Z+1) of the second phase, and for the second set: the energizing end forming the input (I/Z+2) of the third phase, then the energizing end forming the output (O/Z) of the first phase, then the energizing end forming the input (I/Z+1) of the second phase; or
  b. for the first set: the energizing end forming the output (O/Z+1) of the second phase, then the energizing end forming the input (I/Z) of the first phase, then the energizing end forming the output (O/Z+2) of the third phase, and for the second set: the energizing end forming the input (I/Z+1) of the second phase, then the energizing end forming the output (O/Z) of the first phase, then the energizing end forming the input (I/Z+2) of the third phase; or
  c. for the first set: the energizing end forming the output (O/Z) of the first phase, then the energizing end forming the input (I/Z+2) of the third phase, then the energizing end forming the output (O/Z+1) of the second phase, and for the second set: the energizing end forming the input (I/Z) of the first phase, then the energizing end forming the output (O/Z+2) of the third phase, then the energizing end forming the input (I/Z+1) of the second phase.

2. An electric winding for an active portion, which portion is in particular formed of a stator or of a rotor, of a rotary electric machine, the active portion having a body comprising an annular yoke about an axis and a plurality of teeth that extend from a lateral face of the yoke in a radial direction so as to define slots, said slots opening onto a first axial end face and onto a second axial end face of the body; the electric winding having at least one phase system comprising a plurality of electrical phases each comprising a set of pins that are electrically connected to one another and that each have at least one conductive segment, said conductive segments intended to be housed in the same slot forming N layers (Ci), said set of pins comprising a first energizing pin and a second energizing pin each forming a phase input or output, each energizing pin having an energizing end extending from the associated conductive segment to outside the slot and each energizing end forming a phase output being electrically connected to another energizing end forming a phase input of a different phase in order to achieve a delta configuration, the winding being wherein a first set, formed of energizing pins of various phases placed in a first layer among the N layers (Ci), comprises at least one energizing end forming a phase input and at least one other energizing end forming a phase output and in that a second set, formed of energizing pins of various phases placed in a second layer among the N layers (Ci), which second layer is different from said first layer, comprises at least one energizing end forming a phase input and at least one other energizing end forming a phase output wherein, for a given phase, each energizing pin of the first set is arranged in the same slot as an energizing pin of the second set.

3. The electric winding as claimed in claim 1, wherein the energizing pins are placed in edge layers.

4. An electric winding for an active portion, which portion is in particular formed of a stator or of a rotor, of a rotary electric machine, the active portion having a body comprising an annular yoke about an axis and a plurality of teeth that extend from a lateral face of the yoke in a radial direction so as to define slots, said slots opening onto a first axial end face and onto a second axial end face of the body; the electric winding having at least one phase system comprising a plurality of electrical phases each comprising a set of pins that are electrically connected to one another and that each have at least one conductive segment, said conductive segments intended to be housed in the same slot forming N layers (Ci), said set of pins comprising a first energizing pin and a second energizing pin each forming a phase input or output, each energizing pin having an energizing end extending from the associated conductive segment to outside the slot and each energizing end forming a phase output being electrically connected to another energizing end forming a phase input of a different phase in order to achieve a delta configuration, the winding being wherein a first set, formed of energizing pins of various phases placed in a first layer among the N layers (Ci), comprises at least one energizing end forming a phase input and at least one other energizing end forming a phase output and in that a second set, formed of energizing pins of various phases placed in a second layer among the N layers (Ci), which second layer is different from said first layer, comprises at least one energizing end forming a phase input and at least one other energizing end forming a phase output, wherein, for a given phase system, the energizing pins of the first set have a different shape from the shape of the energizing pins of the second set.

5. The electric winding as claimed in claim 1, wherein the pins other than the energizing pins are each formed of two conductive segments that are connected to each other at one of their ends extending from the first axial end face of the body, which end is referred to as the first end, and that are connected to various pins at the other of their ends extending from the second axial end face of the body, which end is referred to as the second end, the first ends of the energizing pins extending from said first axial end face.

6. The electric winding as claimed in claim 1, wherein the winding comprises a first group of conductive pins the conductive segments of which are each placed in two distinct layers separated from each other by at least one intermediate layer, a second group of conductive pins the conductive segments of which are each placed in two distinct layers separated from each other by at least one intermediate layer, the layers comprising the first group of pins being distinct from the layers comprising the second group of pins, and a connecting pin for allowing the first group of pins to be connected to the second group of pins.

7. The electric winding as claimed in claim 1, wherein each set comprises one energizing end per phase of the phase system.

8. A rotary electric machine comprising an active portion, which portion is in particular formed of a stator or of a rotor, which comprises an electric winding as claimed in claim 1.

9. The electric winding as claimed in claim 2, wherein, in a set comprising at least three first ends, the phase inputs/outputs are alternated along the circumference of the winding.

10. The electric winding as claimed in claim 2, wherein the energizing pins are placed in edge layers.

11. The electric winding as claimed in claim 2, wherein, for a given phase system, the energizing pins of the first set have a different shape from the shape of the energizing pins of the second set.

12. The electric winding as claimed in claim 2, wherein the pins other than the energizing pins are each formed of two conductive segments that are connected to each other at one of their ends extending from the first axial end face of the body, which end is referred to as the first end, and that are connected to various pins at the other of their ends extending from the second axial end face of the body, which end is referred to as the second end, the first ends of the energizing pins extending from said first axial end face.

13. The electric winding as claimed in claim 2, wherein the winding comprises a first group of conductive pins the conductive segments of which are each placed in two distinct layers separated from each other by at least one intermediate layer, a second group of conductive pins the conductive segments of which are each placed in two distinct layers separated from each other by at least one intermediate layer, the layers comprising the first group of pins being distinct from the layers comprising the second group of pins, and a connecting pin for allowing the first group of pins to be connected to the second group of pins.

14. The electric winding as claimed in claim 2, wherein each set comprises one energizing end per phase of the phase system.

15. A rotary electric machine comprising an active portion, which portion is in particular formed of a stator or of a rotor, which comprises an electric winding as claimed in claim 2.

16. The electric winding as claimed in claim 4, wherein the energizing pins are placed in edge layers.

17. The electric winding as claimed in claim 1, wherein, for a given phase system, the energizing pins of the first set have a different shape from the shape of the energizing pins of the second set.

18. The electric winding as claimed in claim 4, wherein the pins other than the energizing pins are each formed of two conductive segments that are connected to each other at one of their ends extending from the first axial end face of the body, which end is referred to as the first end, and that are connected to various pins at the other of their ends extending from the second axial end face of the body, which end is referred to as the second end, the first ends of the energizing pins extending from said first axial end face.

* * * * *